Feb. 23, 1960   G. F. FRENCH   2,925,670
READING RATE CONTROLLER
Filed May 6, 1958   2 Sheets-Sheet 1
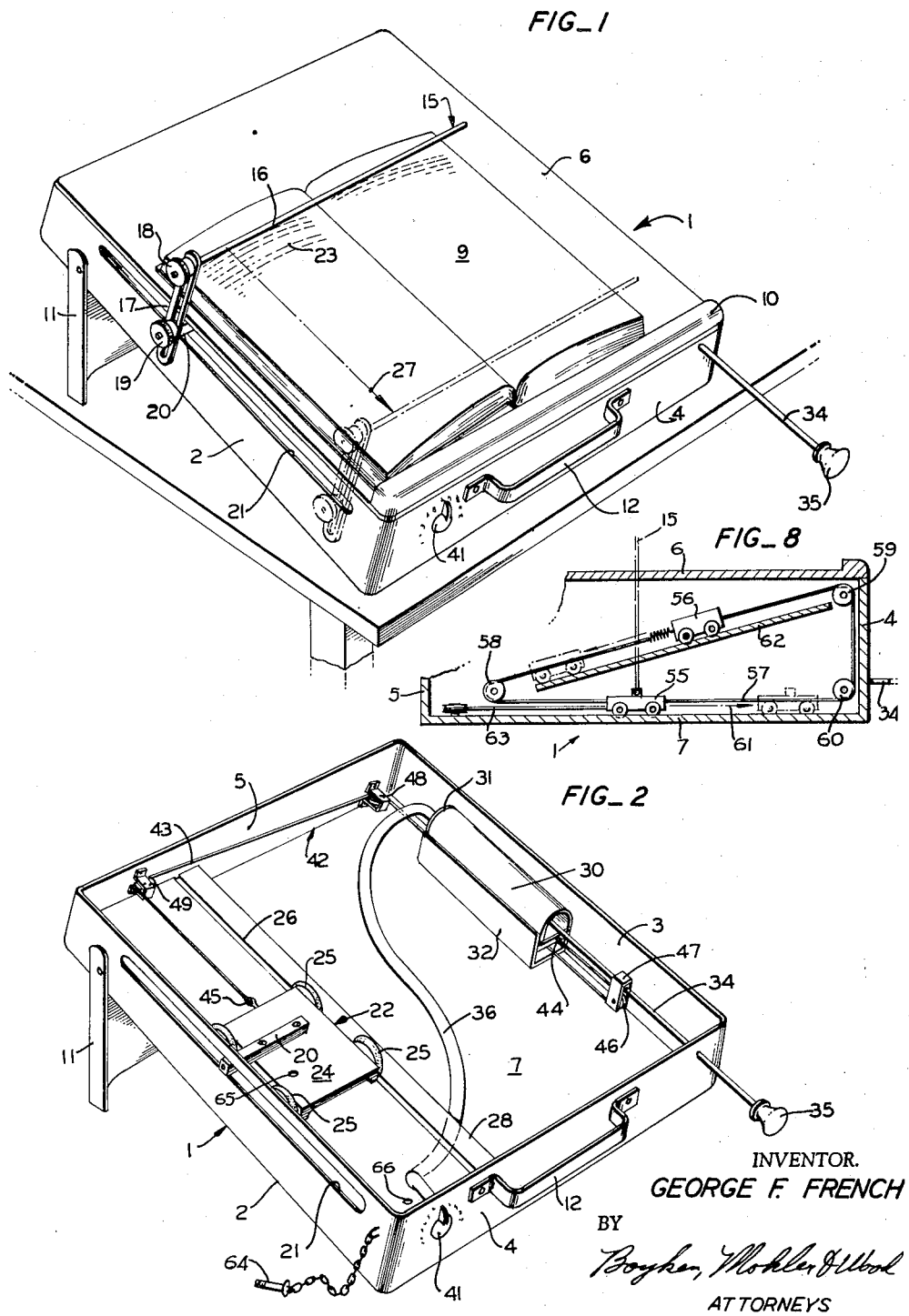
INVENTOR.
GEORGE F. FRENCH
BY
Boyken, Mohler & Wood
ATTORNEYS Feb. 23, 1960
G. F. FRENCH
2,925,670
READING RATE CONTROLLER
Filed May 6, 1958
2 Sheets-Sheet 2
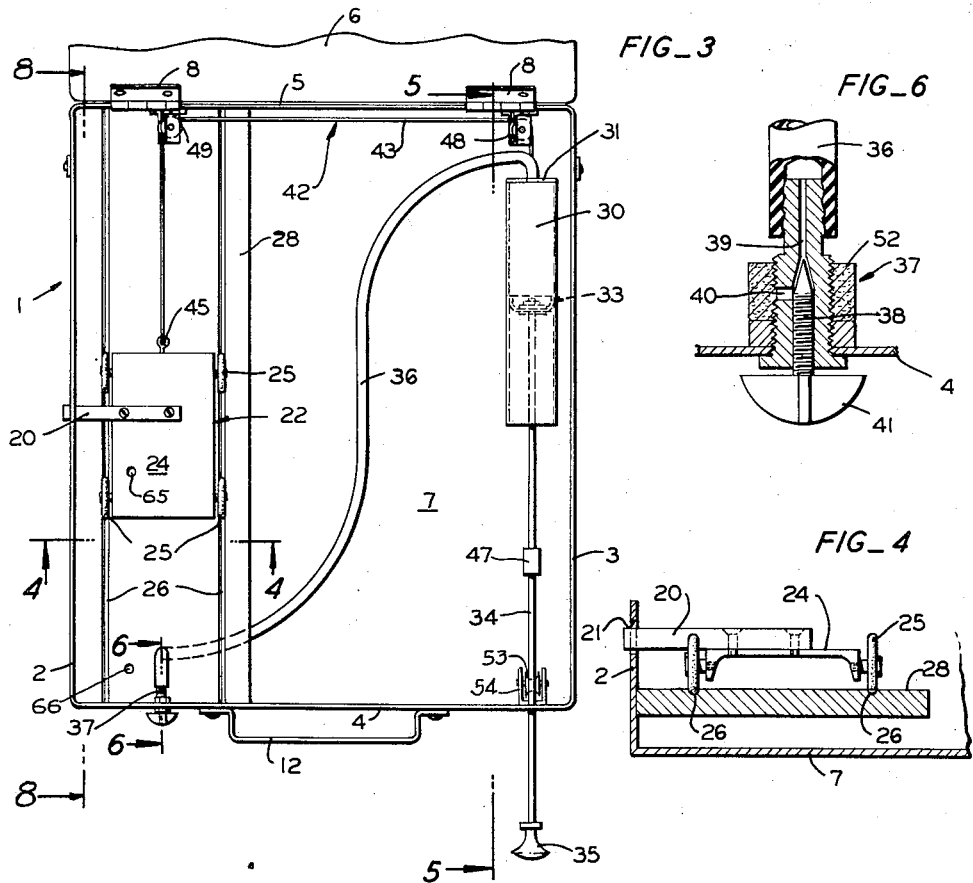
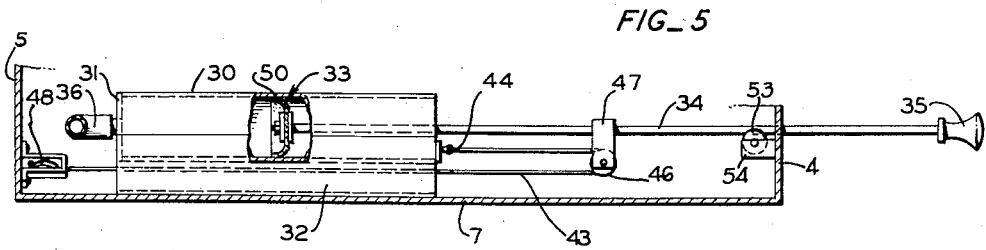
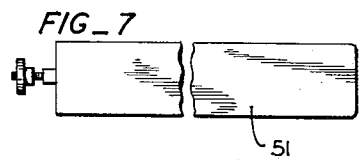
INVENTOR.
GEORGE F. FRENCH
BY
Boyken, Mohler & Wood
ATTORNEYS

# United States Patent Office 2,925,670
Patented Feb. 23, 1960

2,925,670

READING RATE CONTROLLER

George F. French, Berkeley, Calif.

Application May 6, 1958, Serial No. 733,447

7 Claims. (Cl. 35—35)

This invention relates to a reading rate controller and more particularly to a device which simulates a normal reading situation and aids in the training of reading.

Due to an increased interest and emphasis in reading improvement programs in schools, universities, Government agencies, and business organizations, there has developed a substantial demand for mechanical training aids to facilitate the teaching of improved reading habits. Studies in the problems of reading training have repeatedly stressed the principle that the trainee should be "gently pushed" in the improvement of his reading habits, and that he should be minimally conscious of the use of a mechanical training device. Close simulation of the normal reading situation is accordingly an objective of any effective reading training system.

Heretofore, various mechanical devices have been proposed for training readers, usually by indicating successive lines of reading material and forcing the rate at which such lines should be read. This general function may, of course, be performed by placing a ruler across the lines of a book or the like and moving it to successive lines as they are read.

In an attempt to provide a rate of movement of a line indicator and an ability to adjust the rate, many complicated and expensive prior art devices have been proposed. Of those known, all provide some features which distract the reader's attention from the material to be read. For example, those devices which employ electric motors or complicated moving parts create a distracting noise. Others provide a conglomeration of exposed structure which moves during operation of the device, or contain components which must be lifted in order to turn the pages of the reading material, the effect of which is too often a distraction from the reading task.

The device of this invention is therefore proposed as overcoming many of these disadvantages of prior art training aids. A principal object of this invention is the provision of a reading training device which closely simulates the normal reading situation.

It is another object of this invention to provide a reading training device which eliminates influences that distract the reader's attention from the reading material.

Still another object of this invention is the provision of a reading training device which is simple and relatively inexpensive in construction and substantially foolproof in operation.

Yet another object of this invention is the provision of a training device for readers which is easily portable and requires no outside power source.

It is a further object of this invention to provide a reading training device in which the moving parts are enclosed in a housing which comprises both a carrying case and a support for reading material.

A still further object of this invention is the provision of a reading training device which is adaptable to various types of reading training depending upon the advancement of the trainee.

Other objects and advantages will become apparent from the following description taken in connection with the accompanying drawings, in which:

Fig. 1 is a perspective view of the reading rate controller of this invention as it would appear in use;

Fig. 2 is a perspective view similar to Fig. 1 but with the reading material support removed to disclose internal mechanism;

Fig. 3 is a top plan view of the invention of Fig. 1 with the reading material support open to disclose the internal details;

Fig. 4 is an enlarged cross sectional view as seen from line 4—4 of Fig. 3;

Fig. 5 is an enlarged sectional view as seen from line 5—5 of Fig. 3;

Fig. 6 is a greatly enlarged sectional view taken along line 6—6 of Fig. 3;

Fig. 7 is a plan view of an alternative form of line indicator for use with the device of Fig. 1; and Fig. 8 is sectional view, as seen generally from line 8—8 of Fig. 3, but showing a modified form of force-applying means for moving the line indicator.

In detail, the device of this invention comprises a rectangular housing, generally designated 1 having opposed side walls 2, 3 (Fig. 2), front and rear end walls 4, 5, and top and bottom walls 6, 7 (Figs. 1, 2). Housing 1 is formed like a box and top wall 6 provides a cover for said box and is preferably connected by hinges 8 (Fig. 3) to rear wall 5. Wall 6 not only provides a cover for box housing 1 but also provides an upwardly directed surface for supporting reading material 9 (Fig. 1), such as a book. At its edge adjacent front wall 4 cover 6 may be provided with a ledge 10 to aid in supporting the book 9.

The upper surface of the book supporting member 6 is preferably inclined at approximately 20 degrees from the horizontal with the ledge 10 at the lower edge of said inclined member. It has been found that the optimum angle for a school desk or other reading material support is 20 degrees. This may be accomplished either by making the housing 1 deeper at rear wall 5 or by providing legs 11 for elevating the rear end of the housing to the desired degree. Preferably legs 11 may be formed from a single piece of sheet metal and pivotally connected to side walls 2, 3 adjacent end wall 5 so as to be swingable from a collapsed position adjacent the lower edges of walls 2, 3 to the housing supporting position shown. With legs 11 provided in the aforementioned manner, or in any similar manner facilitating the outward pivoting of the leg assembly, the depth of housing 1 may be equal throughout, which is preferable from the standpoint of carrying said housing by means of handle 12 secured to front wall 4.

A line indicator, generally designated 15, is supported for movement in a plane parallel to and spaced upwardly from the upper surface of cover 6. Indicator 15 may be in the form of an elongated, thin rod 16 (Fig. 1) extending across cover 6 from side wall 2 to side wall 3. At its end adjacent side wall 2, rod 16 is connected by means of a link 17 and thumbscrews 18, 19 to a bar 20 extending through an elongated slot 21 in side wall 2 from a small wheeled vehicle 22 (Fig. 2). By means of this connection, rod 16 may be adjustably positioned with respect to the upper surface of cover 6 while being maintained in a parallel relationship with ledge 10.

As will be further described in detail, rod 16 is mounted for movement in a direction normal to its longitudinal axis which is maintained parallel to ledge 10. Since the reading material 9 supported on cover 6 is adapted to abut the ledge 10, rod 16 thereby moves parallel to the lines of print 23 of said reading material.

In order to achieve this result, the cart 22, which comprises a weighted member 24 provided with wheels 25, is mounted for movement within housing 1 along tracks 26 which extend parallel to side wall 2. Tracks 26 are inclined to the horizontal, slanting downwardly toward front wall 4, so that vehicle 22 is impelled by gravity from rear end wall 5 toward said front end wall. It is obvious that wheels 25 are provided rolling in tracks 26 so as to reduce to a minimum the friction encountered by vehicle 22 during said gravitational movement.

Vehicle 22 carries line indicator 15 so as to provide for movement of said line indicator in the direction of arrow 27 (Fig. 1) from the solid line position at the top of the reading material line to the dot-dash line position at the bottom of said reading material.

The tracks 26 may be formed in a separate member 28 (Fig. 4) inclined to the horizontal or said tracks may be formed in bottom wall 7 which will be automatically so inclined when supported by legs 11 in the manner described. In either event the vehicle 22 constitutes a member mounted for movement in the housing from rear wall 5 toward front wall 4 under the influence of gravity.

In order to control the rate of movement of vehicle 22 and thereby the rate of movement of line indicator 15, an air cylinder 30, having a closed end 31 (Figs. 2, 3, 5), is supported in housing 1 by means of a bracket 32. Cylinder 30 is open at its other end and carries a piston 33 reciprocable therein between said ends. Said piston is connected to one end of an elongated rod 34 which extends through front wall 4 of housing 1 and is provided at its other end with a knob 35 for grasping by the fingers.

In order to properly support rod 34 for free movement, a pulley wheel 53 (Figs. 3, 5) is supported in a bracket 54 on front wall 4 adjacent the opening through which rod 34 extends. Rod 34 rides in the groove of wheel 53 so as to be subject to no irregular friction or torque forces during longitudinal movement. It will be understood that the opening through front wall 4, through which rod 34 extends, is slightly larger than said rod so that only the uniform frictional engagement of wheel 53 is applied to rod 34 in normal operation of the device.

The closed end 31 of cylinder 30 is connected by means of a tube 36 to a valve 37 which provides for gradual escape of the air from the closed end of cylinder 30. Valve 37 comprises a threaded needle member 38 (Fig. 6) which may be seated to close the passageway 39, connected to tube 36, from a port 40 which is open to the atmosphere. As needle member 38 is backed off from the seated position by turning knob 41 air is allowed to escape from the closed end of cylinder 30 through tube 36 and passageway 39 and out port 40 at the desired rate. Valve 37 is mounted in front wall 4 of housing 1 so that control knob 41 is accessible from the front of the housing (Fig. 1).

In order to control the movement of vehicle 22 the latter is connected to piston 33 by a connecting means generally designated 42. In the specific embodiment illustrated herein, connecting means 42 comprises a cord 43 which is secured at one end 44 (Figs. 2, 5) to the open end of cylinder 30. The other end 45 (Figs. 2, 3) of said cord is connected to vehicle 22. Intermediate its end cord 43 passes over a pulley 46 supported in a bracket 47 mounted on piston rod 34 and then under cylinder 30 and over a pair of idler pulleys 48, 49 (Fig. 3). In this manner, vehicle 22 in rolling down track 26 under the influence of gravity pulls piston 33 toward the closed end 31 of cylinder 30 with a constant force.

The air trapped between piston 33 and closed end 31 of cylinder 30 can escape only through valve 37, which can be adjusted as previously described, to regulate the escape of air and thereby the rate of movement of piston 33, vehicle 22, and indicator 15 as desired. It will be noted that the pulley and cord arrangement specifically described constitutes a movement or displacement multiplying means so that vehicle 22 carrying indicator 15 moves twice the distance through which piston 33 moves.

Although other connecting and multiplying means may be substituted, the specific illustration herein disclosed is thought to be the simplest and most practicable. Constant force-applying means other than the rolling vehicle 22 may also be employed for pulling piston 33 toward the closed end of the cylinder.

One of such other means may include (Fig. 8) a pair of carts 55, 56, similar to cart 22, supported for movement within housing 1. Said carts are connected for movement together by an endless cord 57 which is carried over pulleys 58, 59, 60. Cart 55 rolls along the bottom wall 7 in the direction of arrow 61 and carries the previously described line indicator 15 parallel to top wall 6 of the housing. Cart 56 rolls on a track 62 inclined to bottom wall 7 and thereby provides the motive power for connected cart 55.

The device of Fig. 8 is intended for use with the housing 1 and its book supporting surface 6 horizontal. Cart 55 is connected by cord to the piston 33 in cylinder 30, as previously described, and pulling rod 34 moves cart 55 toward back wall 5 and cart 56 toward front wall 4. Upon releasing rod 34 cart 56 rolls down inclined track 62 thereby pulling cart 55 along bottom wall 7 and indicator 15 over the reading material supported on surface 6.

It will also be noted in Fig. 6 that valve 37 is preferably covered or wrapped with a silencing means 52. Means 52 may comprise a blanket or collar of fibrous or perforated material which permits air to leak through from port 40 while at the same time breaking up the air flow to prevent a whistling or hissing noise. The provision of silencing means 52 is particularly advantageous when considered with the general purpose of silent operation of the apparatus of this invention.

In operation, the book 9 or other reading material is placed on cover member 6 to be supported thereby with its lower edge against ledge 10. The piston rod 34 is pulled outwardly from front wall 4 of housing 1 thereby drawing piston 33 toward the open end of cylinder 30 and at the same time raising cart 22 to the upper portion or rear end of track 26 to position line indicator 15 at the upper portion of said reading material. When knob 35 of piston rod 34 is released, cart 22 rolls down track 36 carrying line indicator 15 along with it to indicate the successive lines 23 of the reading material. The movement of cart 22 down the track under the influence of gravity is resisted by the air trapped between piston 33 and the closed end 31 of cylinder 30 and permitted to escape only through valve 37 at the predetermined desired rate. Since cart 22 applies a constant force to piston 33, line indicator 15 is caused to move at a constant adjustable rate down the page of reading material.

In order to provide for the passage of air past piston 33 into the closed end portion of cylinder 30 upon the withdrawal of rod 34, said piston may be formed similar to a cup washer 50 (Fig. 5). Cup washer 50 may be provided with a curved, annular, leather flange fitting snugly against the inside wall of cylinder 30 and directed toward closed end 31 so as to seal the piston with respect to the cylinder during movement of the piston toward said closed end. During movement of piston 33 toward the open end of cylinder 30 the cup washer 50 collapses slightly so as to permit passage of the air from said open end past piston 33.

Fig. 7 discloses a modified form of line indicator or shutter 51 which may be used as a replacement for the thin rod 16 for certain types of reading training. Shutter 51 is of a similar length as rod 16 and is similarly releasably connected to cart 22, but said shutter is substantially wider than rod 16 for the purpose of occluding a number of the lines 23 of the reading material 9. For trainees who have a bad habit of frequent regression in their reading, shutter 51, by occluding a substantial number of preceding lines from the line indicated, prevents such regression. Once the regression habit has been cured, the thin rod 16 is preferred for use since it pushes the reader to a more rapid rate of reading, but permits occasional regression which is to be desired.

In order to make the device of this invention more properly portable a locking screw 64 (Fig. 2) may be attached by a chain to housing 1 for being received through a hole in cover 6, a hole 65 in vehicles 27, and a threaded hole 66 in member 28 or in bottom wall 7. In this manner the cover 6 and vehicle 22 may be locked together with housing 1 for preventing movement during transporting the controller. The line indicator 15 or shutter 51 may also be removed and carried under a spring clip or the like in housing 1.

From the above description it is seen that the device of this invention provides all the necessary and desirable features for the training of efficient reading habits without the disadvantages of prior art devices. Not only is the subject device compact and easily portable, but also there are no distracting influences created by the use of this invention.

Although this invention has been described and illustrated in detail, it is obvious that modifications may be made therein without departing from the spirit and scope of the appended claims.

I claim:

1. A reading training device, comprising: an enclosed housing providing an upper surface adapted to support reading material thereon, a cylinder having one closed end mounted in said housing, a piston reciprocable in said cylinder and having a rod extending outwardly of said housing, means movable in said housing and connected to said piston for pulling said piston toward said closed end with a constant force, an adjustable valve connected to said closed end and allowing gradual escape of air therefrom at a desired rate for controlling the speed of movement of said means, and an elongated line indicator extending across said upper surface and spaced upwardly therefrom and connected to said means for movement therewith in a direction normal to the longitudinal axis of said indicator, said means including a weighted member movable along a path inclined from the horizontal under the influence of gravity, and displacement multiplying means connecting said piston and said member.

2. A training device to aid in reading, comprising: a generally rectangular housing provided with opposed side walls, opposed front and rear end walls, and opposed top and bottom walls, said upper wall providing support for reading material, an air cylinder mounted in said housing and having a closed end, a piston slidably mounted in said cylinder for movement toward and away from said closed end, a rod extending from said piston through said front end wall for grasping by the fingers for pulling said piston away from said closed end, a member mounted for movement in said housing from said rear wall toward said front wall by the force of gravity, a connection between said member and said piston for moving said piston toward said closed end in response to said movement of said member, a valve connected to said closed end for permitting escape of air therefrom at a desired rate, and a line indicator removably connected to said member for movement therewith and extending from one of said side walls toward the other spaced above said top wall for successively indicating the lines of said reading material.

3. A training device to aid in reading, comprising: a generally rectangular housing provided with opposed side walls, opposed front and rear end walls, and opposed top and bottom walls, said upper wall providing support for reading material, an air cylinder mounted in said housing and having a closed end, a piston slidably mounted in said cylinder for movement toward and away from said closed end, a rod extending from said piston through said front end wall for grasping by the fingers for pulling said piston away from said closed end, a member mounted for movement in said housing from said rear wall toward said front wall by the force of gravity, a connection between said member and said piston for moving said piston toward said closed end in response to said movement of said member, a valve connected to said closed end for permitting escape of air therefrom at a desired rate, and a line indicator removably connected to said member for movement therewith and extending from one of said side walls toward the other spaced above said top wall for successively indicating the lines of said reading material, said valve including means for adjusting the rate of escape of air mounted on said front end wall.

4. A training device to aid in reading, comprising: a generally rectangular housing provided with opposed side walls, opposed front and rear end walls, and opposed top and bottom walls, said upper wall providing support for reading material, an air cylinder mounted in said housing and having a closed end, a piston slidably mounted in said cylinder for movement toward and away from said closed end, a rod extending from said piston through said front end wall for grasping by the fingers for pulling said piston away from said closed end, a member mounted for movement in said housing from said rear wall toward said front wall by the force of gravity, a connection between said member and said piston for moving said piston toward said closed end in response to said movement of said member, a valve connected to said closed end for permitting escape of air therefrom at a desired rate, and a line indicator removably connected to said member for movement therewith and extending from one of said side walls toward the other spaced above said top wall for successively indicating the lines of said reading material, a track in said housing extending generally parallel to said top wall and between said end walls, and supporting said member for said movement, and means supporting said top wall and said track in a position inclined to the horizontal.

5. A training device to aid in reading, comprising: a generally rectangular housing provided with opposed side walls, opposed front and rear end walls, and opposed top and bottom walls, said upper wall providing support for reading material, an air cylinder mounted in said housing and having a closed end, a piston slidably mounted in said cylinder for movement toward and away from said closed end, a rod extending from said piston through said front end wall for grasping by the fingers for pulling said piston away from said closed end, a member mounted for movement in said housing from said rear wall toward said front wall by the force of gravity, a connection between said member and said piston for moving said piston toward said closed end in response to said movement of said member, a valve connected to said closed end for permitting escape of air therefrom at a desired rate, and a line indicator removably connected to said member for movement therewith and extending from one of said side walls toward the other spaced above said top wall for successively indicating the lines of said reading material, a track in said housing extending generally parallel to said top wall and between said end walls, and supporting said member for said movement, and means supporting said top wall and said track in a position inclined to the horizontal, at an angle of approximately twenty degrees, said means including legs foldably secured to said housing adjacent said rear end wall.

6. A training device to aid in reading, comprising: a generally rectangular housing provided with opposed side walls, opposed front and rear end walls, and opposed top and bottom walls, said upper wall providing support for reading material, an air cylinder mounted in said housing and having a closed end, a piston slidably mounted in said cylinder for movement toward and away from said closed end, a rod extending from said piston through said front end wall for grasping by the fingers for pulling said piston away from said closed end, a member mounted for movement in said housing from said rear wall toward said front wall by the force of gravity, a connection between said member and said piston for moving said piston toward said closed end in response to said movement of said member, a valve connected to said closed end for permitting escape of air therefrom at a desired rate, and a line indicator removably connected to said member for movement therewith and extending from one of said side walls toward the other spaced above said top wall for successively indicating the lines of said reading material, means sealing said piston with respect to said cylinder during movement of said piston toward said closed end and permitting passage of air past said piston during movement thereof away from said closed end.

7. A training device to aid in reading, comprising: a generally rectangular housing provided with opposed side walls, opposed front and rear end walls, and opposed top and bottom walls, said upper wall providing support for reading material, an air cylinder mounted in said housing and having a closed end, a piston slidably mounted in said cylinder for movement toward and away from said closed end, a rod extending from said piston through said front end wall for grasping by the fingers for pulling said piston away from said closed end, a member mounted for movement in said housing from said rear wall toward said front wall by the force of gravity, a connection between said member and said piston for moving said piston toward said closed end in response to said movement of said member, a valve connected to said closed end for permitting escape of air therefrom at a desired rate, and a line indicator removably connected to said member for movement therewith and extending from one of said side walls toward the other spaced above said top wall for successively indicating the lines of said reading material, and means silencing said valve from the noise of escaping air.

References Cited in the file of this patent

UNITED STATES PATENTS

| | | |
|---|---|---|
| 2,265,924 | Oerter et al. | Dec. 9, 1941 |
| 2,568,577 | Alexander | Sept. 18, 1951 |
| 2,632,258 | Erickson | Mar. 24, 1953 |